United States Patent
Iwata et al.

(10) Patent No.: US 6,327,088 B1
(45) Date of Patent: Dec. 4, 2001

(54) POLARIZING PLATE WITH DIFFUSING MEANS

(75) Inventors: Yukimitsu Iwata; Fumihiro Arakawa, both of Tokyo (JP)

(73) Assignee: Dai Nippon Printing Co., Ltd., Tokyo (JP)

(*) Notice: Subject to any disclaimer, the term of this patent is extended or adjusted under 35 U.S.C. 154(b) by 0 days.

(21) Appl. No.: 09/598,309

(22) Filed: Jun. 21, 2000

Related U.S. Application Data

(62) Division of application No. 09/158,555, filed on Sep. 22, 1998, now Pat. No. 6,111,699.

(30) Foreign Application Priority Data

Feb. 25, 1998 (JP) ...................................... 9-259913
Dec. 26, 1998 (JP) ...................................... 9-359663

(51) Int. Cl.$^7$ .............................. G02B 13/20; B05D 5/06; G03B 21/60
(52) U.S. Cl. ..................... 359/599; 427/163.1; 359/452
(58) Field of Search ...................... 427/163.1; 359/599, 359/615, 443, 452, 483, 485

(56) References Cited

U.S. PATENT DOCUMENTS

| 5,706,134 | 1/1998 | Konno et al. . |
| 5,909,314 | 6/1999 | Oka et al. . |
| 6,163,402 | * 12/2000 | Chou et al. ........................ 359/443 |

* cited by examiner

Primary Examiner—Cassandra Spyrou
Assistant Examiner—Jared Treas
(74) Attorney, Agent, or Firm—Oliff & Berridge, PLC

(57) ABSTRACT

A light diffusing film is produced by preparing a paint by adding a light transmissive diffusing material comprising resin beads to a light transmissive resin, and coating the paint on one or both of the surfaces of transparent film substrate made of TAC, to produce a light diffusing layer. In the light diffusing film, the haze value on the surface of light diffusing layer is three or more, the difference between the haze value along the normal and that along the lines ±60° apart from the normal is four or less, and the surface is practically smooth whose roughness is so adjusted as to give a surface roughness Ra of Ra≦0.2 μm. Application of such a light diffusing film onto a display panel inhibits scattering reflection which would otherwise cause the display to be whitish, reduces the variation of haze values which vary depending on the viewed angle, and thus improves display quality.

6 Claims, 9 Drawing Sheets

POLARIZING PLATE WITH DIFFUSING MEANS

This is a Division of application Ser. No. 09/158,555 filed Sep. 22, 1998, now U.S. Pat. No. 6,111,699. The entire disclosure of the prior application is hereby incorporated by reference herein in its entirety.

BACKGROUND OF THE INVENTION

1. Field of the Invention

This invention relates to a light diffusing film and its manufacture, and a polarizing plate with a light diffusing layer, and a liquid crystal display apparatus which are suitably used for the display of a word-processor, computer, television set or the like, for a polarizing plate or an optical lens to be incorporated in a liquid crystal display apparatus, and as for a cover of various meters, and as the windowshield glass of an automobile or of a railway coach.

2. Prior Art

The display apparatus of a computer or the like as described above uses various light diffusing films to improve its visibility.

Of such light diffusing films some depend on surface roughness to assume a light diffusing activity while others depend on a diffusing material contained in a resin film where the difference in refractive indices between the resin and the diffusing material is responsible for the light diffusing activity.

When the light diffusing activity of a given film depends-on its surface roughness, the light diffusing activity and the transparency of film vary according to from which angle it is seen, and thus the visibility thereof varies according to from which angle it is seen, which poses a problem. For example, with a display apparatus incorporating such a film, an image on display is quite visible when seen from front, but the same image becomes whitish when the visual angle becomes large.

Such a light diffusing film containing a diffusing material in its resin substrate as described above is disclosed, to take as an example a film applied to a reflection type liquid crystal display apparatus, in Journal of Illumination Research Society MD-96-48 (1996) pp. 277–282.

According to this disclosure, to obtain a reflection type liquid crystal display apparatus with a high contrast, it is important to design the apparatus such that the frontal light diffusing intensity is appropriately adjusted, and the backward light diffusing intensity is strongly suppressed, because such design is advantageous for the realization of a bright display and a high resolution, and further ensures the realization of a birefringent film which will compensate for the optical performance of liquid crystal which, in turn, will be beneficial for widening the effective view angle.

The disclosure further asserts that, to achieve above object, it will be better to use a film where light diffusing occurs as a result of mismatch in refractive indices among film constituents, rather than a film where light diffusing occurs as a result of surface roughness, because with the latter film the backward light diffusing intensity will become so large as to lower the contrast. Namely, the disclosure recommends the use of a resin film which contains a diffusing material within, where light diffusing activity is invoked by the difference in refractive index among film constituents.

The above-cited article in Journal of Illumination Research Society MD-96-48 states, utilizing the light diffusing theory offered by Mie and the theory by Hartel as a concept to support the design of an effective light diffusing film, it is possible to obtain a film with an optimum light diffusing activity, by appropriately adjusting the relative refractive index m between a diffusing material and a resin, and the size parameter $\alpha$ and particle density parameter Nd of diffusing material, and particularly it is useful for achievement of above purpose to keep the size parameter $\alpha$ at 10 or more.

The size parameter $\alpha$ is $\alpha=2\pi R/\lambda$, and thus it depends on the diameter R of diffusing material ($\lambda$ represents the wavelength of light).

Accordingly, if the size parameter $\alpha$ be 10 or more, inevitably the diffusing material will have a large particle size in association. If a diffusing material with such a large particle diameter consisting, for example, of spherical particles made of a plastics, is allowed to disperse in a transparent polymer (resin), the resultant film will become thick, and thus usable combinations of a diffusing material and resin for molding will be limited, or the film will develop a birefringence when molded by extrusion. These pose a problem when the film is put to practice.

Further, when such a light diffusing film is applied to a liquid crystal display, it must be applied to the outside surface of liquid crystal panel, because, if it were applied to the inside surface of liquid crystal panel, it would interfere with the polarizing activity of the display unit.

The alternative, conventional method whereby reflection of rays incident on the surface of a transparent substrate is prevented includes a method wherein an anti-reflection coat is applied on the surface of a glass or plastics substrate, a method wherein an ultra-thin film made of $MgF_2$ or other metals having a thickness of about 0.1 μm is applied by vapor deposition on a transparent substrate made of glass or the like, a method wherein an ionizing-radiation setting resin is coated on the surface of a plastics acting as a plastics lens, and then another film made of $SiO_2$ or $MgF_2$ is plated by vapor deposition on the former, and a method wherein an ionizing-radiation setting resin is coated and on that hardened coat is applied a film with a low refractive index.

However, for those conventional films to be given a light diffusing activity, only the outermost layer is available, and thus they can not have an anti-reflection layer if a light diffusing layer is prepared on the outermost layer. Hence, if such a light diffusing film is applied onto the surface of panel of a liquid crystal display apparatus, reflection of rays incident on the surface is not sufficiently prevented.

Further, with a conventional reflex type liquid crystal apparatus, it is generally a custom to place polarizing plates on both surfaces of a liquid crystal cell, and to add to one of them a diffuse reflection plate having a roughened surface.

However, when the diffuse reflection plate is placed on the outside surface of liquid crystal cell, a ghost display called parallax develops depending on the thickness of glass of liquid crystal cell, which greatly impairs the visibility of the display.

To prevent the development of parallax, a method has been developed wherein only a single polarizing plate is used, and a metal electrode in the liquid crystal cell is allowed to act also as a light reflection agent. When the metal electrode assumes a light reflecting property by acting as a mirror, the visual angle becomes narrow, and brightness along the normal decreases. When the metal electrode assumes a light diffuse reflection property by having a roughened surface, it becomes difficult to control the orientation of liquid crystal, and the production processes become complicated. This poses a new problem.

SUMMARY OF THE INVENTION

The present invention has been performed in consideration of the above-mentioned existing problems, and an object of the invention is to provide: a light diffusing film which is thin, does not impose any restrictions on the selection of diffusing materials and resins, does not develop a birefringence, and is also applied in the interior of display panel, and its manufacture; and a polarizing plate and a display apparatus each with a light diffusing layer attached thereto.

A further object of the present invention is to provide a light diffusing film which further includes an anti-reflection layer to sufficiently prevent the occurrence of reflection rays out of incident rays coming from outside, and its manufacture; and a polarizing plate and a liquid crystal display apparatus each with a light diffusing layer.

The present invention attains the above-mentioned object by means of a light diffusing film which has, on at least one of the surfaces of a transparent film substrate, a light diffusing layer laminated which comprises a light transmissive resin containing a light transmissive diffusing material being different from the light transmissive resin in refractive index, wherein the haze value on the surface of light diffusing layer is three or more, the difference between the haze value along the normal and that along the lines having angles ±60° apart from the normal is four or less, and Ra representative of the surface roughness is 0.2 μm or less.

The difference Δn in refractive index between the light transmissive resin and the light transmissive diffusing material of the light diffusing layer may be chosen so as to satisfy the inequality $0.01 \leq \Delta n \leq 0.5$, and the average particle diameter of light transmissive diffusing material may be chosen so as to satisfy the inequality $0.1 \ \mu m \leq d \leq 5 \ \mu m$.

The present invention attains the above-mentioned object by means of a light diffusing film which has, on at least one of the surfaces of a transparent film substrate, a light diffusing layer laminated which comprises a light transmissive resin containing a light transmissive diffusing material, wherein, between the light transmissive diffusing material and the light transmissive resin of the light diffusing layer, or on at least part of that interface, is inserted a layer having a lower refractive index than those of the light transmissive diffusing material and resin.

The layer with a lower refractive index may be formed of air.

The layer with a lower refractive index may be a coat applied on the perimeter of light transmissive diffusing material.

Further, the haze value on the surface of light diffusing layer may be three or more, and the difference between the haze value along the normal to the surface and that along the lines ±60° apart from the normal may be four or less.

Still further, the transparent film substrate may be made of either triacetate cellulose or polyethylene terephthalate.

The transmissive resin may have an bonding activity or adhesive activity.

Still further, the light transmissive resin may be a ultra violet setting resin, and the light transmissive diffusing material may comprise melamine beads.

Still further, the light diffusing layer may have, on at least one of the front and back surfaces, an anti-reflection layer including an optical thin film.

To achieve above object, this invention provides a manufacture of the light diffusing film as above described which comprises the steps of choosing melamine beads as a light transmissive diffusing material and a UV setting resin as a light transmissive resin, applying the liquid light diffusing layer onto a transparent film substrate, and radiating UV rays thereupon to harden the light transmissive resin.

To achieve above object, this invention provides a manufacture of the light diffusing film as above described which comprises the steps of converting the light transmissive diffusing material into beads, coating their perimeter with a material which, while the light transmissive resin is hardening, will become gas or adsorptive to the light transmissive resin, and applying that matter together with the liquid light transmissive resin onto a transparent film substrate to harden thereupon.

Still further, to achieve above object, this invention provides a manufacture of the light diffusing film as above described which comprises the steps of coating the liquid light diffusing layer onto a transparent film substrate, overlaying a molding film thereupon whose surface has been so finely modified as to have a surface roughness of 0.2 μm or less, and peeling off the molding film, after allowing the initially-coated layer to harden.

Still further, to achieve above object, this invention provides a manufacture of the light diffusing film as above described which comprises the steps of applying a polarizing plate with laminated polarizing layers onto at least one of the surfaces of transparent film substrate, and applying a light diffusing layer on the other surface of transparent film substrate. An anti-reflection layer including an optical thin film may be laminated on either the polarizing layer or the light diffusing layer.

Further, to achieve above object, this invention provides a liquid crystal display apparatus which has a liquid crystal panel, and a polarizing plate with a coat of light diffusing layer applied on the display surface of liquid crystal panel.

The liquid crystal panel may be of reflex type which has, on its rear surface, a reflective member with a mirror-like reflective activity.

This invention is based on a finding that, assumed that a light diffusing film includes a light diffusing layer consisting of a light transmissive resin containing a light transmissive diffusing material with a different refractive index, preparing the light diffusing layer such that the haze value of the surface be three or more, the difference between the haze value along the normal and that along the lines ±60° apart from the normal be four or less, and the surface roughness Ra be 0.2 μm or less, will make it possible to render the particle size of light transmissive diffusing material sufficiently small, and the display quality of, for example, liquid crystal display surface good to excellent, and to introduce the resulting light diffusing film in the interior of liquid crystal panel if required.

This invention is based on another finding that, when between the light transmissive diffusing material and the light transmissive resin is inserted a layer which has a refractive index lower than those of the former two, the relative refractive index m between the light transmissive diffusing material and the light transmissive resin becomes large, which will make it possible to reduce the necessary add amount of light transmissive diffusing material.

DETAILED DESCRIPTION OF THE PREFERRED EMBODIMENTS

Embodiments of this invention will be described in detail below with reference to attached figures.

Figure 1:
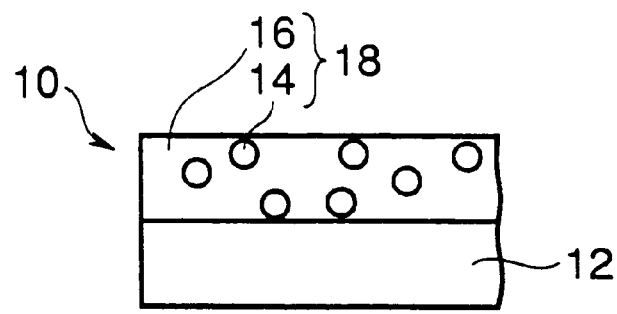
FIG. 1 is a cross-sectional view of a light diffusing film representing Embodiment 1 of this invention.

As shown in FIG. 1, the light diffusing film 10 representing Embodiment 1 of this invention has, on one (upper one in the figure) of the surfaces of transparent film substrate 12, a light diffusing layer 18 comprising a light transmissive resin 16 containing a light transmissive diffusing material 14 wherein the haze value on the surface of light diffusing layer 18 is three or more, the difference between the haze value along the normal and those along the lines ±60° apart from the normal is 0.7 or less, and the surface roughness Ra of light diffusing layer 18 is 0.2 μm or less.

When the light diffusing layer 18 has a surface roughness Ra of 0.2 μm or less as described above, it has a flatter surface than the conventional homologue which has a roughened surface, and thus it can greatly suppress diffuse reflections which may cause display to whiten. This will contribute to the realization of a clear display.

Generally, the lower the haze value of light diffusing layer 18, the less blurred the display, that is, the clearer the display. However, unless the haze value were three or more, effects brought about by light diffusing would not be manifest, and a uniform display independent of visual angles would be impossible. Further, unless the difference between the haze value along the normal and that along the lines ±60° apart from the normal were below four, the display would look blurred when viewed from an oblique angle, which is not desirable.

To obtain a display which is clear, uniform independent of visual angles and less blurred when viewed from an oblique angle, with the present embodiment, the difference Δn between the refractive index of light transmissive resin 16 and that of light transmissive diffusing material 14 both serving as the constituents of the light diffusing layer 18 was made to satisfy the inequality $0.01 \leq \Delta n \leq 0.5$, and the average particle diameter d of diffusing material to satisfy the inequality $0.1\ \mu m \leq d \leq 5\ \mu m$.

The reason why the difference Δn in refractive index was placed in above range is as follows. If the difference in question were made below 0.1, it would be necessary for the light diffusing layer 18 to contain a greater amount of diffusing material in the light transmissive resin to develop a sufficient light diffusing activity, and then adherence of the light diffusing layer 18 to the transparent film substrate 12 would be impaired, and thus easiness with which the diffusing material can be coated would be damaged. On the contrary, if Δn were made over 0.5 μm, the content of light transmissive diffusing material 14 in the light transmissive resin 16 would become too meager to realize a uniform light diffusing layer 18.

The reason why the average particle size d of light transmissive diffusing material 14 was placed in above range is as follows. If d were made below 0.1 μm, dispersion of the light transmissive diffusing material 14 into the light transmissive resin 16 would become so difficult that clumping of particles might result, and thus the formation of a uniform light diffusing layer would be impossible. On the contrary, if d were made $d \leq 5\ \mu m$, the light transmissive diffusing material 14 would protrude from the surface, and ruin the uniform flatness thereof.

The reason why the difference between the haze value along the normal to the surface of light diffusing layer 18 and the haze value along the lines ±60° apart from the normal was made four or less is based on knowledge the inventors has obtained through experiments (see Examples and Tables described later).

The preferred material of the transparent film substrate 12 includes transparent resin films, transparent resin plates, transparent resin sheets, and transparent glass.

The transparent resin film may include triacetate cellulose (TAC) films, polyethylene terephthalate (PET) films, diacetyl cellulose films, acetatebutylelte cellulose films, polyether sulfon films, polyacryl-based resin films, polyurethane-based resin films, polyester films, polycarbonate films, polysulfon films, polyether films, polymethylpentane films, polyetherketone films, (metha) acrylnitrile films, etc. Ordinarily, it may have a thickness of 25–1000 μm.

As a material of the transparent film substrate 12, TAC with no birefringence is particularly preferred, because it is possible with it to laminate a light diffusing film with a polarizing element coated thereupon, thereby to produce a polarizing plate with a light diffusing layer (described later), and further to obtain therewith a liquid crystal display apparatus excellent in display quality.

In another aspect, as a material of the transparent film substrate 12, PET is particularly preferred, especially in cases where formation of the light diffusing layer 18 requires coating of many layers, and for this purpose the film substrate must have a sufficient resistance to heat, a mechanical strength, and a responsiveness to mechanical processing.

The preferred light transmissive resin 16 serving as a constituent of light diffusing layer 18 may include following three kinds of resins: resins which will be set when exposed mainly to UV rays/electron beams, that is, ionizing-radiation setting resins; mixtures of an ionizing-radiation setting resin with a thermoplastic resin and a solvent; and thermosetting resins.

The coat forming component of an ionizing-radiation setting resin composition may preferably include compounds with an acrylate functional group, such as comparatively low molecular weight polyester resins, polyether resins, acryl resins, epoxy resins, urethane resins, alkyd resins, spiroacetal resins, polybutadiene resins, polythiolpolyen resins, and olygomers or prepolymers of (metha) allylate homologues of compounds having multiple functional groups such as polyatomic alcohols, etc. The reactive diluent may include diluents containing a comparatively large amount of monomers with a single functional group such as ethyl (metha) acrylate, ethylhexyl (metha) acrylate, styrene, methyl styrene, N-vinyl pyrrolidone, etc., and of monomers with multiple functional groups such as polymethylolpropanetri (metha) acrylate, hexanediol (metha) acrylate, tripropyleneglicoldi (metha) acrylate, diethyleneglycoldi(metha) acrylate, pentaerythritoltri (metha) acrylate, dipentaerythritolhexa (metha) acrylate, 1,6-hexanedioldi (metha) acrylate, neopentylglycoldi (metha) acrylate, etc.

Further, to make the ionizing-radiation setting resin composition into a UV ray setting resin composition, it may be added, as an initiator of photically induced polymerization, acetophenons, benzophenons, Michler's benzoyl benzoate, α-amyloximester, tetramethylthiurum monosulfide, thioxantones, and as a photo-multiplying agent n-butylamine, triethylamine, poly-n-bytylphosphine, etc. Particularly, with this invention it is preferred to add urethane acrylate as an olygomer and dipentaerythritolhexa (metha) acrylate, etc. as a monomer for mixture.

Furthermore, a solvent drying resin may be added in addition to the aforementioned ionizing-radiation setting resin as a component of the light transmissive resin 16 which forms a constituent of the light diffusing layer 18. Mainly the solvent drying resin may include thermoplastic resins. The solvent drying thermoplastic resin to be added to the ionizing-radiation setting resin may include those used for general applications, but when a cellulose resin such as TAC is used as a material of transparent substrate film 12, the appropriate solvent drying resin may include cellulose resins such as nitrocellulose, acetylcellulose, celluloseacetate propionate, ethylhydroxyethylcellulose, etc., because the resulting coat will have a good adhesive activity and transparency.

The reason why above solvent drying resin is advantageous is as follows. Assume that toluene is used as a solvent for such a cellulose resin. Toluene is a solvent ineffective to polyacetyl cellulose, which is usually a constituent of a transparent film substrate 12. Nevertheless, a coat including the solvent drying resin in question dissolved in toluene will retain a good adhesive activity to the transparent film substrate 12. In addition, because toluene does not dissolve polyacetyl cellulose or the constituent of film substrate, the surface of transparent film substrate 12 will not become whitish, and retain its transparency.

Further, addition of a solvent drying resin to the ionizing-radiation setting resin composition will bring a benefit described below.

Assume that the ionizing-radiation setting resin composition is coated on a transparent film substrate with a roll coater having a metalling roll. A liquid resin membrane remaining on the surface of metalling roll flows in the course of time to form streaks and indentations, which may be transferred to the surface of a coat which may result in the formation of similar streaks and indentations thereupon. However, addition of a solvent drying resin to the ionizing-radiation setting resin will eliminate the possibility of development of such flaws on the coat surface.

The method for hardening the ionizing-radiation setting resin composition may include any common methods routinely employed for hardening ionizing-radiation setting resin compositions using electron beams or ultraviolet rays.

Hardening via electron beams may take place, for example, by the use of electron beams having an output voltage in the range of 50–1000 KeV, or more preferably 100–300 KeV emanated from any kind of electron beam accelerator such as Cockcroft-Walton type, van-de-Graaff type, resonance transformer type, insulating core transformer type, linear type, dinamitron type, radio wave type, etc. Hardening via UV rays may take place using UV rays emanated from a ultra-high voltage mercury lamp, high voltage mercury lamp, low voltage mercury lamp, carbon arc, xenon arc, metal halide lamp, etc.

The thermoplastic resin to be added to the ionizing-radiation setting resin may include senor resins, urea resins, diallylphtalate resins, melamine resins, guanamine resins, unsaturated polyester resins, polyurethane resins, epoxy resins, aminoalkyd resins, melamine-urea co-condensed polymer resins, silicone resins, polysiloxane resins, etc. They may be used as appropriate in combination with a cross-linking agent, a polymerization initiator, a polymerization stimulator, a solvent, a viscosity adjuster, etc. if need be.

The light transmissive diffusing material 14 to be added to the light diffusing layer 18 preferably includes plastic beads: particularly those that give a high transparency, and present a refractive index which is so different from that of matrix resin (light transmissive resin 16) as to satisfy the above relation.

The plastic bead may include melamine beads (refractive index being 1.57), acryl beads (refractive index being 1.49), acryl-styrene beads (refractive index being 1.54), polycarbonate beads, polyethylene beads, polystyrene beads, vinylchloride beads, etc. The average particle size of these beads should be so chosen as to fall in the above range of 0.1–5 μm.

When the light transmissive diffusing material 14 is added, it also acts as an organic filler, and the organic filler readily sinks when mixed with the resin composition (light transmissive resin 16). To prevent the light transmissive diffusing material from sinking readily to bottom, a silica, etc. as an inorganic filler may be added. What should be noted in this connection is this: addition of an inorganic filler will be effective for preventing the organic filler from precipitating, but may give adverse effects on the transparency of resulting coat. Therefore it is recommendable to add an inorganic filler having the particle size, preferably, of 0.5 μm or less to the light transmissive resin 16 at a concentration not exceeding 0.1 weight % so that it can prevent the precipitation of diffusing material, without inflicting any adverse effects on the transparency of resulting coat.

When an inorganic filler to prevent the precipitation of organic filler is not added, it is necessary to stir the coat material thoroughly to evenness before it is coated onto the surface of transparent film substrate 12, because otherwise the organic filler might accumulate on the bottom.

Generally, the ionizing-radiation setting resin has a refractive index of about 1.5, or nearly the same with that of glass. But its refractive index should be adjusted when its refractive index is smaller than that of light transmissive diffusing material 14. Adjustment for upping the refractive index in question is achieved by adding appropriate particles made of a substance having a high refractive index such as $TiO_2$ (refractive index being 2.3–2.7), $Y_2O_3$ (refractive index being 1.87), $La_2O_3$ (refractive index being 1.95), $ZrO_2$ (refractive index being 2.05), $Al_2O_3$ (refractive index being 1.63) at such an amount as to be compatible with the distensibility of resulting coat.

In the embodiment represented by FIG. 1, a light diffusing layer 18 is formed on one surface of (upper surface in the figure) of transparent film substrate 12. But, as shown in Embodiment 2 of this invention represented by FIG. 2, the light diffusing layer may be formed on both surfaces of transparent film substrate 12.

Figure 3:
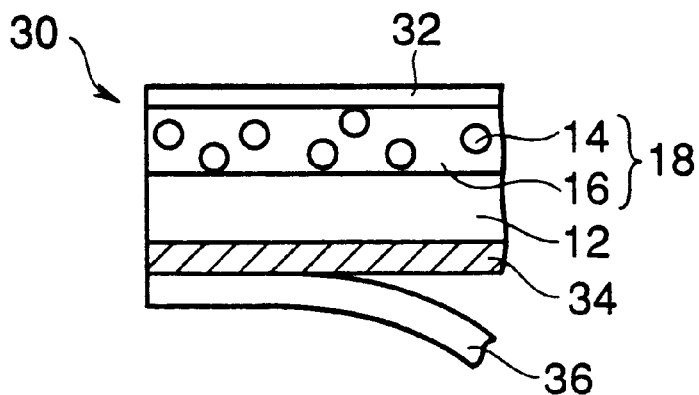
FIG. 3 is a cross-sectional view of a light diffusing film representing Embodiment 3 of the same.

Next, description will be given of a light diffusing film 30 of Embodiment 3 of this invention as represented by FIG. 3.

Production of this light diffusing film 30 consists of forming an anti-reflection layer 32 on the outer surface of light diffusing layer 18 of light diffusing film 10 shown in FIG. 1, and laminating an adhesive layer 34 and a separator 36 in this order on the surface of transparent film substrate 12 opposite to the surface upon which the anti-reflection layer has been formed.

The anti-reflection layer 32 is formed mainly to prevent rays coming from outside from being reflected at the display surface.

The anti-reflection layer 32 contains an optical thin layer, production of which consists of applying a coat comprising an anti-reflection pigment, an ultra-thin film of $MgF_2$ or the like with a thickness of about 0.1 μm, a metal plated film, or a $SiO_2$ or $MgF_2$ plated film prepared by vapor deposition. The thickness of film in question should be adjusted in the manner described below.

Assume that incident light having a wavelength of $\lambda_0$ perpendicularly hits upon the thin film, the anti-reflection film has a refractive index of $n_0$, and a thickness of h, and the substrate has a refractive index of $n_g$. For the anti-reflection film to completely inhibit the reflection of the incident light, or, to completely transmit the incident light through itself, it is known that the anti-reflection film must satisfy the equations (1) and (2) described below (Science Library, Physics=9, "Optics," pp. 70–72, 1980, published by Science Co.).

$$n_0 = \sqrt{n_g} \quad (1)$$

$$n_0 h = \lambda_0/4 \quad (2)$$

Namely, if refractives $n_0$ and $n_g$ are larger than 1, $n_0 > n_g$ never fails to stand. Accordingly, when an anti-reflection layer 32 is added on the outside surface of light diffusing layer 18, it is necessary for the optical thin layer acting as the anti-reflection layer 32 to have a refractive index no which is smaller than that of light diffusing layer 18.

Generally, the light transmissive resin 16 constituting the light diffusing layer 18 has a refractive index of about 1.5, or the same with that of glass. To be compatible with the resin having such a refractive index, the optical thin layer acting as the anti-reflection layer 32 is preferably made of an inorganic material such as LiF (refractive index being 1.4), $MgF_2$ (refractive index being 1.4), $3NaF.AlF_3$ (refractive index being 1.4), $AlF_3$ (refractive index being 1.4), $Na_3AlF_6$ (cryolite; refractive index being 1.33), etc.

As an alternative case, assume that the anti-reflection film is made of $MgF_2$ having a refractive index of $n_0=1.38$, and incident light has a wavelength of $\lambda_0=5500$Å (reference). From equation (2), it is deduced that the best condition is obtained when the anti-reflection film has a thickness of about 0.1 μm.

If, for a given anti-reflection film 32, a light transmissive resin 16 could not be obtained that would give a refractive index to satisfy equation (1) in relation to the refractive index of that anti-reflection film, it is necessary as described earlier to add fine particles made of a material having a high refractive index such as $TiO_2$ to that resin, to raise therewith the refractive index of resulting mixture.

Formation of the anti-reflection layer 32 is performed by choosing as appropriate one from general thin film forming techniques including, for example, vapor deposition in vacuum, sputtering, reaction sputtering, ion plating, electric plating, etc.

The adhesive layer 34 implemented on the side of transparent film substrate 12 opposite to the side upon which the anti-reflection layer 32 has been formed is used when the light diffusing film 30 is attached, for example, to a liquid crystal panel: the separator 36 is peeled off; the exposed adhesive surface of adhesive layer 34 is pressed against the liquid crystal panel; and then the light diffusing film 30 is fixed to the latter.

Figure 4:
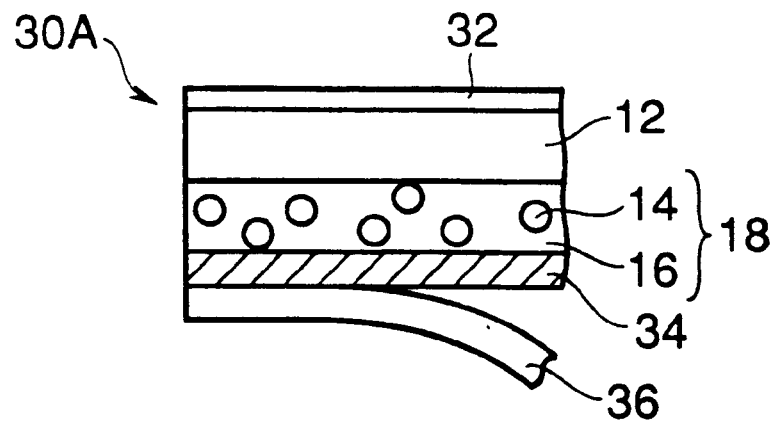
FIG. 4 is a cross-sectional view of a light diffusing film representing Embodiment 4 of the same.

The positional relation of the light diffusing layer 18 of light diffusing film 30 to the transparent film substrate 12 with respect to the anti-reflection layer 32 in FIG. 3 may be reversed as shown in the light diffusing film 30A in FIG. 4.

Further, the light transmissive resin 16 may be made of an adhesive material, to make thereby the resulting the light transmissive resin 16 also act as an adhesive layer. In such case, the adhesive layer 34 in FIG. 4 may be dismissed.

Figure 5:
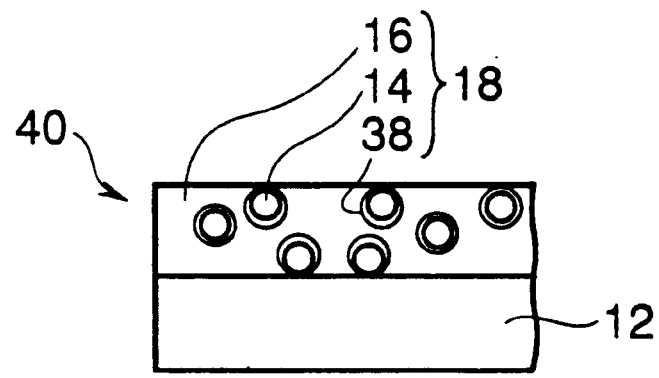
FIG. 5 is a cross-sectional view of a light diffusing film representing Embodiment 1 where a layer with a low refractive index is inserted between a light transmissive resin and a light transmissive diffusing material.

Next, description will be given of Embodiment 5 of this invention as shown in FIG. 5.

Production of the light diffusing film 40 of Embodiment 5 consists of inserting, between the light transmissive resin 16 and the light transmissive diffusing material 14 constituting the light diffusing film 10 of the aforementioned first embodiment represented in FIG. 1, a lower refractive layer 38 with a lower refractive index than those of the light transmissive diffusing material 14 and resin 16.

Because other composition is the same with that of Embodiment 1, the same symbols are attached to corresponding parts, and further explanation will be omitted.

When, between the light transmissive diffusing material 14 and the light transmissive resin 16, a low refractive layer 38 is inserted which has a lower refractive index than those of the former two, light passing through the light transmissive resin 16 enters the low refractive layer 38 and is then reflected from the surface of light transmissive diffusing material 14, and thus a remarkable light diffusing effect is obtained.

Further, in this particular embodiment, the light transmissive diffusing material 14 and the light transmissive resin 16 do not make direct contact with each other, and thus the difference in refractive index of the two does not pose a notable problem.

The low refractive layer 38 may be formed of a gas, liquid or solid body, but when a gas such as air is employed, a remarkable light diffusing effect will be obtained because it has a low refractive index (refractive index being 1).

When the light transmissive diffusing material 14 was made of melamine beads, and the light transmissive resin 16 of a UV setting resin, and the cross-section of light diffusing layer 18 was observed after hardening of the resin, it was found, although the reason remains unclear, that a space (low refractive layer) with a thickness of about 0.1 µm exists between each of spherical melamine beads with a diameter of 1.5 µm and hardened light transmissive resin 16.

Alternatively, the light transmissive resin 16 may be made of a resin which will expand when being transferred from a liquid state to a solid state, such that, after hardening of the resin, a space comes into being around each of particles acting as the light transmissive diffusing material 14.

As a further variation, the light transmissive diffusing material 14 may have its outer surface coated with a material which absorbs the hardening or hardened light transmissive resin 16.

As a still further variation, the light transmissive diffusing material 14 may have its outer surface coated with a material which has a smaller refractive index than those of light transmissive diffusing material 14 and light transmissive resin 16 in advance such that the coat may act as a low refractive layer 38 later.

In this case, the coating material may take any state chosen from liquid, gel and solid states when the light transmissive resin 16 has hardened.

When, between the light transmissive diffusing material 14 and the light transmissive resin 16, is inserted a low refractive layer which has a smaller refractive index than those of the former two in the manner as stated above, the low refractive layer exerts such a remarkable light diffusing effect that the necessary amount of light transmissive diffusing material will become smaller than otherwise is possible. Through this device, it is possible to prevent the display from becoming whitish, suffering decolorization, and exhibiting a disturbed polarization which would otherwise occur as a result of the existence of excess diffusing material, and thus to ensure a clear display.

Figure 2:
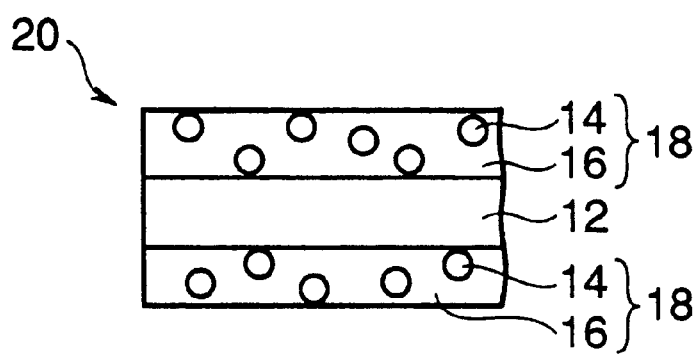
FIG. 2 is a cross-sectional view of a light diffusing film representing Embodiment 2 of the same.
Figure 6A:
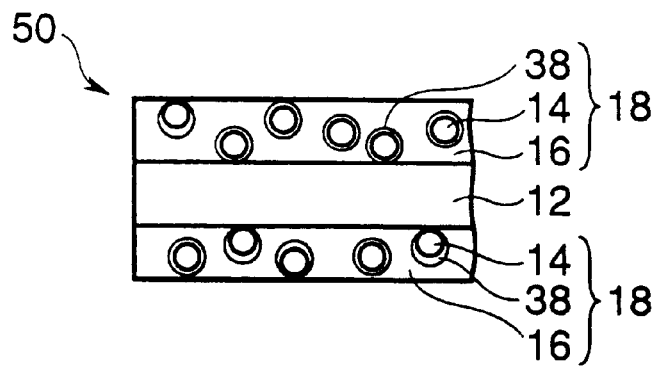
FIGS. 6A–6C are cross-sectional views of light diffusing, films according to Embodiments 2 to 4.
Figure 6B:
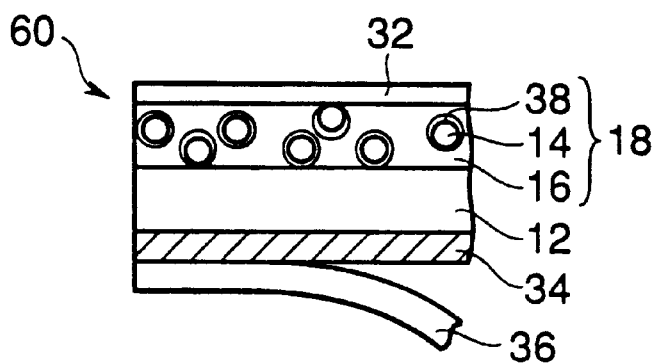
Figure 6C:
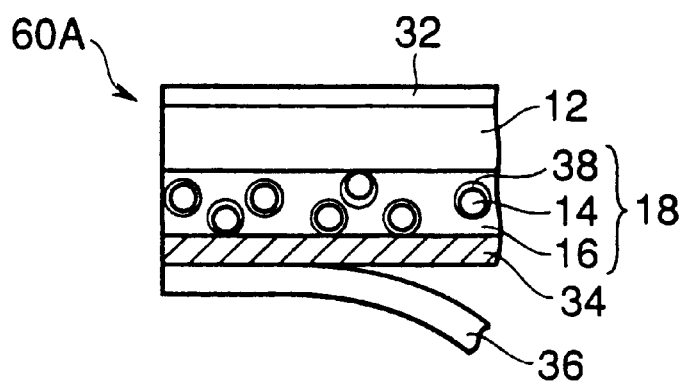

Embodiment 5 represented in FIG. 5 as described earlier consists of the light diffusing layer 18 formed on one surface of transparent film substrate 12, and in the same manner as in Embodiments 2 to 4 represented in FIGS. 2 to 4, it may have a low refractive layer 38 inserted between the light transmissive diffusing material 14 and the light transmissive resin 16, and the resulting light diffusing film incorporating those three elements can take any composition out of 50, 60 or 60A of FIGS. 6A to 6C.

Figure 7:
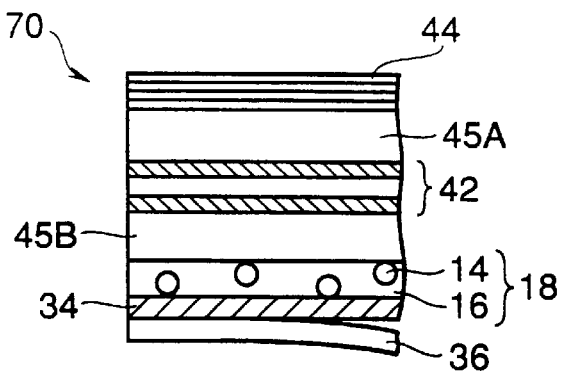
FIG. 7 is a cross-sectional view of a polarizing plate incorporating the light diffusing film of this invention.
Figure 8A:
FIG. 8 is a cross-sectional view of film to illustrate the production process by which the light diffusing film of this invention is produced.
Figure 8B:
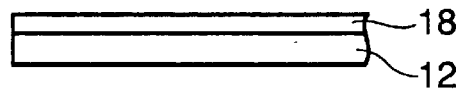
Figure 8C:
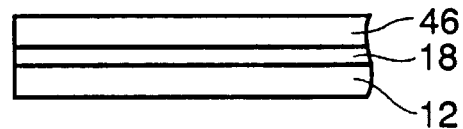
Figure 8D:
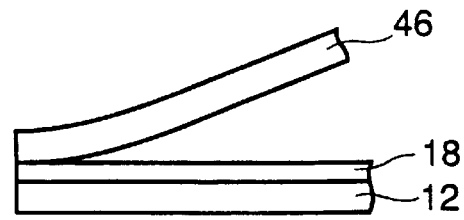

Next, description will be given of Embodiment 1 of a polarizing plate with a light diffusing layer of this invention as represented in FIG. 7.

As shown in FIG. 7, this embodiment concerns with a polarizing plate with a light diffusing layer 70 wherein an anti-reflection layer 44 is formed on one surface (upper surface in FIG. 4) of a polarizing layer 42 and a light diffusing layer 18 having the same constitution as above is formed on the other surface.

The polarizing layer 42 has a three layered structure which contains a film between two transparent film substrates 45A and 45B made of TAC. The first and third layers are films made of polyvinyl alcohol (PVA) supplemented with iodine, and the second layer between the two is a film made of PVA.

The anti-reflection layer 44 has the same constitution as the aforementioned anti-reflection layer 32 formed on the light diffusing film 30.

As TAC composing the transparent substrates placed on both outer surfaces of polarizing layer 42 has no birefringence, and thus does not interfere with the polarizing activity, TAC substrates do not interfere with the polarizing activity of films made of PVA and of PVA plus iodine even when they are overlapped with the latter. Hence it is possible by the use of such a polarizing plate with a light diffusing layer 70 to obtain a liquid crystal display apparatus which gives a high quality display.

The polarizing element composing the polarizing layer 42 to be inserted into the polarizing plate with a light diffusing layer, 70 may be, besides the PVA film described above, polyvinylformal film, polyvinylacetal film, ethylene-vinylacetate copolymerized saponized film or etc.

When individual films are placed one over another to form the polarizing layer 42, it is better to saponize TAC films in advance because such treatment will improve the adhesive activity of those films, and reduce accumulation of static electricity thereupon.

Next, description will be given of the process necessary for the formation of light diffusing layer 18 with reference to FIG. 8.

On a transparent film substrate 12 shown in (A) of FIG. 8, is applied a light transmissive resin 16 supplemented with a light transmissive diffusing material 14 as shown in (B) of FIG. 8; on the top of coat is laminated a finely roughened molding film 46 which has a surface roughness of Ra=0.2 µm or less such that the film comes into a close contact with the underlying coat (see (C) of FIG. 8); next, when the light transmissive resin 16 is made of an electron-beam or UV ray setting resin, an electron beam or UV rays as appropriate is radiated onto the resin through the molding film 46; or when the resin is a dissolved, dried type resin, it is heated to harden; and the molding film 46 is peeled off from the hardened light diffusing layer 18.

Adoption of this process allows the formation of a light diffusing layer 18 which, even though generally having smooth surfaces, has one surface so finely modified as to assume a surface roughness of Ra=0.2 µm or less which corresponds to the surface roughness of molding film 46.

Hence, the light transmissive resin layer formed through above process on the light diffusing layer 18 will have a smoother surface than the same would have if it were simply coated on the latter without resorting to above process.

Figure 9:
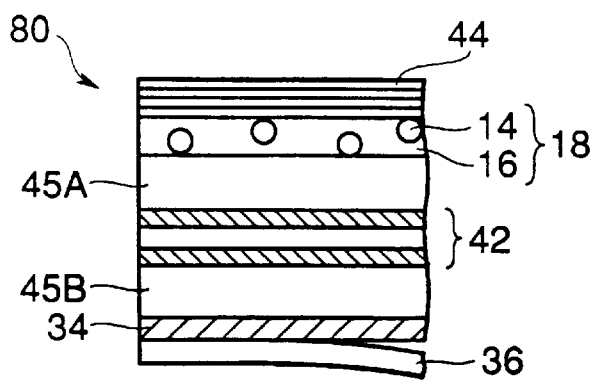
FIG. 9 a cross-sectional view of a polarizing plate with a light diffusing layer representing Embodiment 2 which incorporates a polarizing plate containing a light diffusing film of this invention.

The light diffusing layer 18 may be placed above the polarizing layer 42, as shown by a polarizing plate with a light diffusing layer 80 in FIG. 9, that is, just inside of the anti-reflection layer 44.

Figure 10:
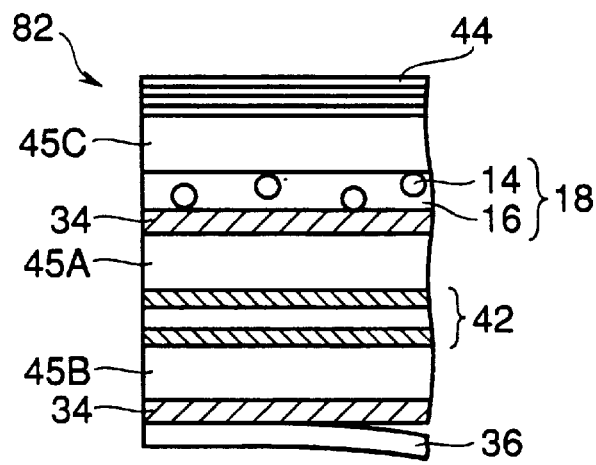
FIG. 10 is a cross-sectional view of a polarizing plate with a light diffusing layer of Embodiment 3.

Further, as indicated by a polarizing plate 82 with a light diffusing layer in FIG. 10, a third TAC film 45C may be placed inside of the anti-reflection layer 44; just inside of this TAC film 45C may be introduced a light diffusing layer 18; and the light diffusing layer 18 may be further laid, through the bonding activity of adhesive layer 34 inserted in between, onto TAC film 45A.

Figure 11:
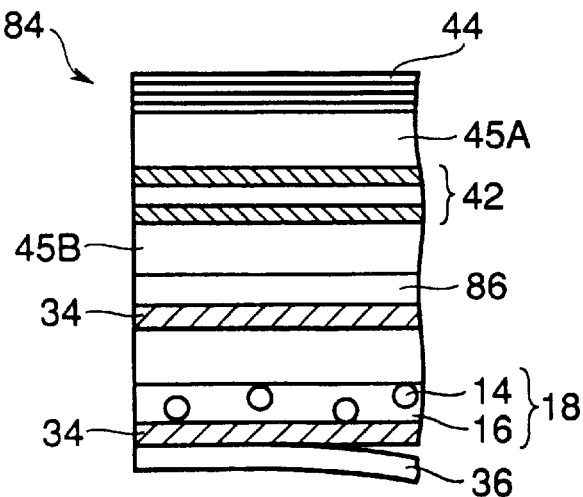
FIG. 11 is a cross-sectional view of a polarizing plate with light diffusing layer of Embodiment 4.
Figure 12A:
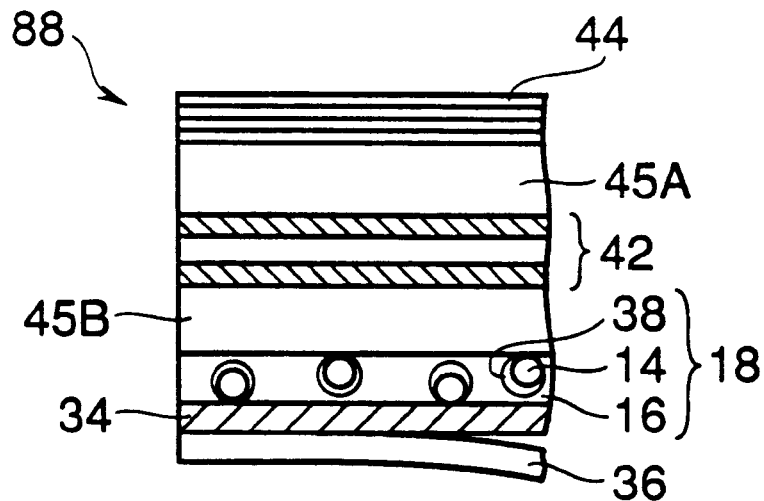
FIGS. 12A and 12B are cross-sectional views of polarizing plates ea with a polarizing layer of Embodiments 1 and 2, each of which has a layer with a low refractive index inserted between a light transmissive diffusing material and a light transmissive resin.
Figure 12B:
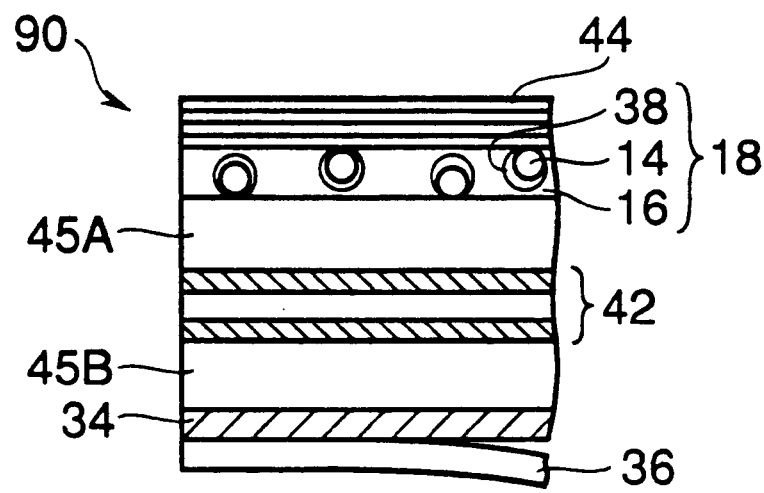
Figure 13A:
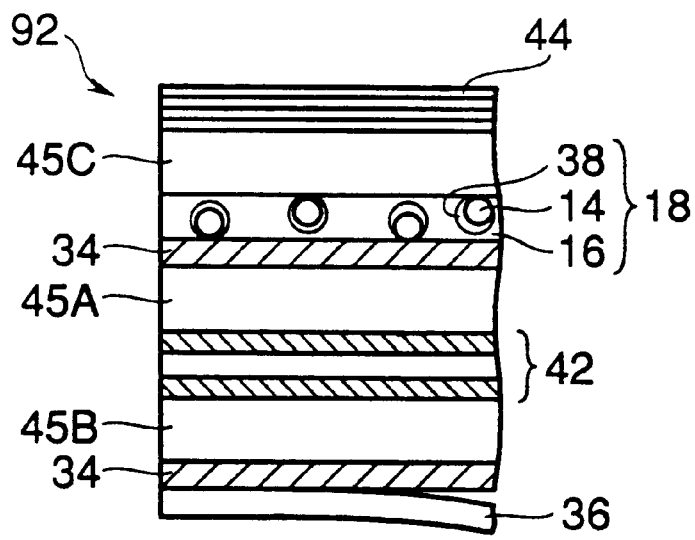
FIGS. 13A and 13B a cross-sectional views of polarizing plates each with a light diffusing layer of Embodiments 3 and 4, each of which has a layer with a low refractive index inserted between a light transmissive diffusing material and a light transmissive resin.
Figure 13B:
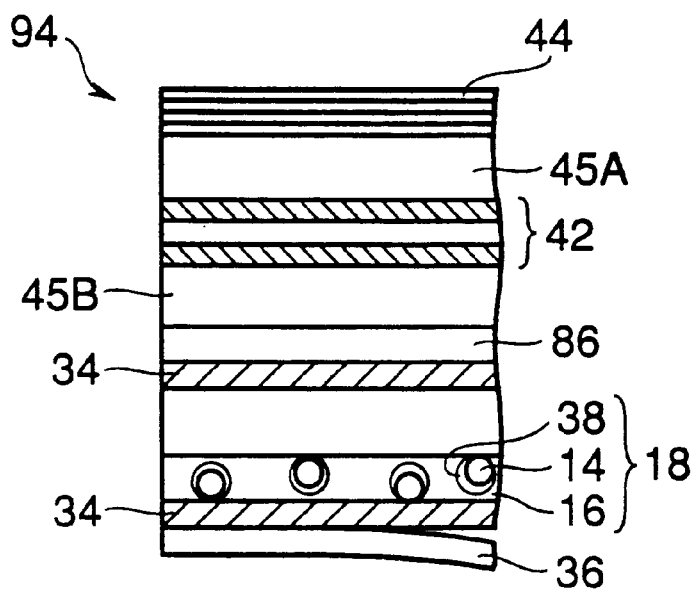

Furthermore, as indicated by a polarizing plate 84 with a light diffusing layer of FIG. 11, a phase difference layer 86, an adhesive layer 34 and TAC film 45C in this order when counted from the side of TAC film 45B, may be inserted between TAC film 45B and the light diffusing layer 18 of the polarizing plate 70 with a light diffusing layer 70 in FIG. 7.

With regard to the polarizing plate with a light diffusing layer as represented by Embodiments of FIG. 7 and FIGS. 9 to 11, the light transmissive diffusing material 14 which constitutes a part of light diffusing layer 18 may have a low refractive layer inserted between the light transmissive diffusing material 14 and the light transmissive resin 16 as shown by Embodiments of FIGS. 5 and 6.

Polarizing plates with a light diffusing layer 88, 90, 92 and 94 corresponding with the polarizing plates with a light diffusing layer 70, 80, 82 and 84 of FIG. 7 and FIGS. 9 to 11 are shown in FIGS. 12A and 12B, and FIGS. 13A and 13B.

Because other composition is the same with that of polarizing plates with a light diffusing layer shown in FIG. 7 and FIGS. 9 to 11, the same symbols are attached to corresponding parts, and further explanation will be omitted.

Figure 14:
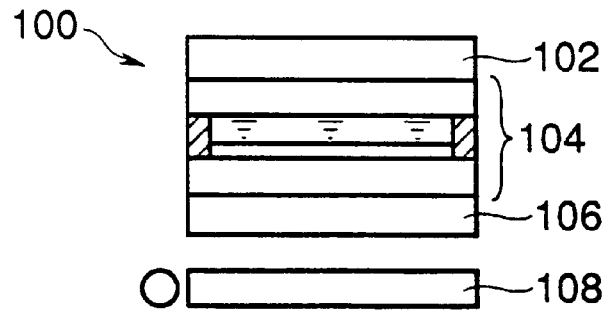
FIG. 14 is a cross-sectional view of Embodiment 1 representing a liquid crystal display apparatus of this invention.
Figure 15:
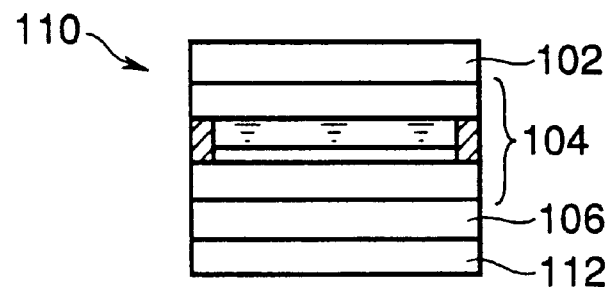
FIG. 15 is a cross-sectional view of Embodiment 2 representing the same.
Figure 16:
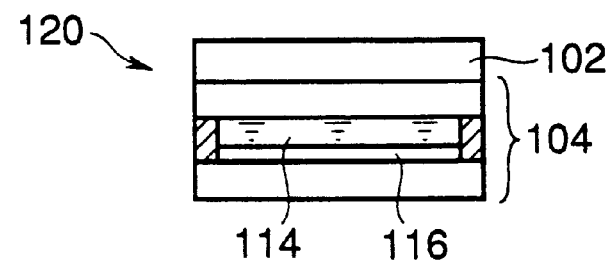
FIG. 16 is a cross-sectional view of Embodiment 3 representing the same.

Next, explanation will be given of embodiments embodying liquid crystal display apparatuses of this invention as represented by FIGS. 14 to 16.

The liquid crystal display apparatus 100 shown in FIG. 14 is a transmission type liquid crystal display apparatus which consists of a polarizing plate with a light diffusing layer 102, a liquid crystal panel 104 and a polarizing plate 106 placed one over another in this order, and further contains a back light 108 on the rear surface of polarizing plate 106.

FIG. 15 shows a reflection type liquid crystal display apparatus 110 which is applied from outside to a relevant system. With this liquid crystal display apparatus 110, instead of the back light as used in said liquid crystal display apparatus 100, a reflection plate 112 is placed in close contact with the polarizing plate 106.

FIG. 16 shows a reflection type liquid crystal display apparatus 120 containing an internal reflection electrode incorporating the method of this invention. This liquid crystal display apparatus 120 contains a reflection electrode 116 within a liquid crystal cell 114 of a liquid crystal panel 104, which also acts as an electrode of reflection plate. The polarizing plate 106 and reflection plate 112 of liquid crystal display apparatus in FIG. 15 are omitted in this embodiment.

The mode how liquid crystal exists in the liquid crystal panel 104 of liquid crystal display apparatuses 100, 110 and 120 may take any one chosen from twist nematic type (TN), super twist nematic type (STN), guest-host type (GH), phase conversion type (PC), polymer dispersing type (PDLC), etc.

Further, the driving mode of liquid crystal may be of simple matrix type or of active matrix type, and when it is of active matrix type, the driving occurs in TFT or MIM mode.

Furthermore, the liquid crystal panel 104 may of color type or of monochromatic type.

EXAMPLE

Next, Examples of this invention will be described below.

Table 1 list the results obtained from Examples 1 to 11 representing light diffusing films prepared according to this invention in comparison with comparative examples 1 to 3 representing similar light diffusing films prepared according to conventional techniques: the test films were attached to a liquid crystal display so that one can evaluate whether their attachment may improve the quality of display when the display is visually inspected from a distance 30 cm apart from the display surface.

TABLE 1

| | Production method; | Ra ($\mu$m) | Haze; 0° | Haze; 60° | Transparency; 0° | Transparency; 60° | Display quality |
|---|---|---|---|---|---|---|---|
| Example 1; | A | 0.038 | 12.2 | 12.4 | 98.6 | 98.9 | Good |
| Example 2; | A | 0.051 | 36.0 | 37.2 | 94.4 | 94.9 | Good |
| Example 3; | A | 0.062 | 60.6 | 64.2 | 87.4 | 87.9 | Slightly whitish |
| Example 4; | A | 0.048 | 16.7 | 17.3 | 97.4 | 97.8 | Good |
| Example 5; | A | 0.042 | 17.8 | 18.3 | 98.1 | 98.6 | Good |
| Example 6; | A | 0.052 | 19.2 | 19.7 | 97.8 | 98.3 | Good |
| Example 7; | B | 0.048 | 24.1 | 24.6 | 96.2 | 96.7 | Good |
| Example 8; | A | 0.041 | 18.9 | 19.2 | 98.1 | 98.6 | Good |
| Example 9; | A | 0.052 | 23.3 | 23.8 | 96.8 | 97.1 | Good |
| Example 10; | A | 0.049 | 35.2 | 36.0 | 95.6 | 95.9 | Slightly uneven coloration |

TABLE 1-continued

| | Production method; | Ra ($\mu$m) | Haze; 0° | Haze; 60° | Transparency; 0° | Transparency; 60° | Display quality |
|---|---|---|---|---|---|---|---|
| Example 11; | A | 0.055 | 36.9 | 37.6 | 93.9 | 94.5 | The best |
| Comparative example 1; | A | 0.497 | 42.3 | 72.1 | 47.2 | 25.9 | Whitish display |
| Comparative example 2; | A | 0.042 | 2.7 | 2.8 | 99.1 | 99.2 | Inadequate light diffusing |
| Comparative example 3; | A | 1.320 | 65.4 | 86.3 | 33.8 | 17.6 | Whitish display |

From Table 1, it is obvious that, when the light diffusing layer has a surface roughness of Ra=2 $\mu$m or less, and its haze value is three or more, and haze value along the normal to the surface of light diffusing layer differs by 0.7 or less from that of the lines ±60° apart from the normal, the resulting panel gives a display good or excellent in quality, and that, if a panel giving a slightly whitish display is tolerated, the face plate with a light diffusing film whose haze value is 0.7 or less will also fall within the tolerable limit.

The manner how above evaluation was performed was as follows.

Production of Examples 1 to 9 proceeded as follows: TAC film was used as a material of transparent film substrate; and on this film was coated a paint containing melamine beads, acryl beads or acrylstyrene beads as shown in Tables 2 to 4 as a light diffusing material, and a resin composition described below.

TABLE 2

| | Melamine beads, weight parts. Average particle diameter: 1.2 $\mu$ |
|---|---|
| Example 1 | 1.11 |
| Example 2 | 3.89 |
| Example 3 | 7.41 |
| Comparative example 1 | 0.20 |

TABLE 3

| | Melamine beads; | |
|---|---|---|
| | Average particle size; ($\mu$m) | Weight parts |
| Example 4 | 0.1 | 1.62 |
| Example 5 | 0.3 | 1.85 |
| Example 6 | 0.6 | 1.79 |
| Example 7 | 5.0 | 3.21 |

TABLE 4

| | Diffusing material; | Refractive index; | Average particle size($\mu$m); | Weight parts |
|---|---|---|---|---|
| Example 8 | Acryl beads | 1.49 | 2.0 | 30.0 |
| Example 9 | Acryl styrene beads | 1.54 | 2.0 | 36.0 |

UV setting resin: pentaerythrytolacrylate, 100 weight parts;
Photo-polymerization initiator: 3 weight parts;
Cellulose propionate: 1.25 weight part;
Leveling agent: silicone, 0.1 weight part; and Organic solvent: toluene, 130 weight parts.

The UV setting resin has a refractive index of 1.50.

For Example 10, PET was used instead of TAC as a material of transparent film substrate, and other conditions were the same with those of Example 2.

Production of Example 11 proceeded as follows: on the top of light diffusing layer of light diffusing film of Example 2 was deposited $MgF_2$ (refractive index being 1.38) by vapor deposition to form a thin film of magnesium fluoride having a thickness of 900Å, and therewith a light diffusing film having an anti-reflection layer in the same manner as the embodiment of FIG. 3 was obtained.

Examples 1 to 11 were produced by either method A or B as shown in Table 1.

Method A consists of preparing a light diffusing paint from a resin component and a light diffusing material as described above, coating the paint on a film substrate by the gravure reverse method such that the resulting coat has a thickness of 20 μm/dry, maintaining the film at 70° C. for two minutes to evaporate the solvent to dryness, and passing the film under a UV radiation unit with an output of 240W at a rate of 20 m/min; thereby allowing the resin to harden. Method B consists of coating a light diffusing paint on a film substrate by the gravure reverse method such that the resulting coat has a thickness of 20 μm/dry, maintaining the film at 70° C. for two minutes to evaporate the solvent to dryness to produce a coated film, laminating a PET molding film with smooth surfaces (whose surface roughness Ra is Ra≦2 μm) onto the coated film such that the finely roughened surface of molding film gets in close contact with the coat, passing the film assembly under the UV radiation unit with an output of 240W at a rate of 20 m/min, and then peeling off the molding film to produce a light diffusing film with a light diffusing layer whose surface is smooth.

A light diffusing paint was coated on a film substrate by gravure reverse method such that the resulting coat has a thickness of 20 μm/dry; a PET molding film whose surfaces had been finely roughened was laminated onto the coated film such that the finely roughened surface of molding film got in close contact with the coat; the film assembly was passed under the UV radiation unit with an output of 240W at a rate of 20 m/min; and then the molding film was peeled off to produce a light diffusing film with a light diffusing layer whose surface is finely roughened.

Comparative example 2 was a light diffusing film obtained under the same conditions as in Examples 1 to 9 except that it incorporated a diffusing material as listed in Table 2.

Comparative example 3 was a light diffusing film obtained under the same conditions as in Example 7 except that it was produced by method A.

Results of surface roughness as listed in Table 1 were obtained after the profile along the middle line of a given light diffusing film had been traced with a meter (Surfcoder AY-31, Kosaka Research Institute), and surface roughness were averaged to give an average surface roughness Ra.

Acquisition of haze values and transparency values consisted of using a meter (Haze card plus, Toyo Fine Machination Co.) according to the "Standard testing method for determination of haze and light transmission of transparent plastics," ASTMD1003.

Next, light diffusing films each having a low refractive layer 38 between a light transmissive diffusing material 14 and a light transmissive resin 16 were attached to a liquid crystal display in the same manner as described above; the display quality was visually evaluated from a distance 30 cm apart from the display surface; and the evaluation results are listed in Table 5.

TABLE 5

| | Diffusing material, Diameter, Refractive index | Weight parts; | Anti-reflection layer | Reflection (%); | Color | Contrast ratio; | Haze 0° | 60° | Display quality |
|---|---|---|---|---|---|---|---|---|---|
| Example | | | | | | | | | |
| 1 | Melamine; 1.2 μm 1.57 | 1.11 | Absent; | 14 | OK | 79 | 12.2 | 12.4 | Slightly dark |
| 2 | id; | 3.89 | Absent; | 33 | OK | 62 | 36.0 | 37.2 | Good |
| 3 | id; | 7.41 | Absent; | 61 | Slightly yellowish, | 55 | 60.6 | 64.2 | Slightly low contrast |
| 4 | id; | 3.89 | present; | 30 | Slightly bluish, but acceptable; | 67 | 36.9 | 37.6 | Good |
| Comparative example | | | | | | | | | |
| 1 | id; | 0.20 | Absent; | 1.6 | OK | 91 | 2.7 | 2.8 | Dark, inadequate light |
| 2 | Acryl; 1.2 μm 1.49 | 7.69 | Absent; | 2.2 | OK | 88 | 2.5 | 2.6 | id; |
| 3 | id; | 36.0 | Absent; | 19 | Slightly yellowish, | 43 | 17.3 | 17.7 | Low contrast |

Substrate: TAC

Production of Comparative example 1 consisted of preparing a light diffusing paint by mixing a resin component described below and melamine beads listed in Table 2, and coating the paint on a TAC film serving as a transparent film substrate.

UV setting resin: urethaneacrylate, 100 weight parts;

Photo-polymerization initiator: 3 weight parts; and

Organic solvent: toluene, 130 weight parts.

Method C by which Comparative example 1 was produced was as follows.

Determination of contrast ratio as listed in Table 5 was achieved, for a white/black display, by measuring brightness changes with a brightness meter (BM-7, Topcon) and by calculating the ratio of brightness of white display against brightness of black display, that is, by utilizing the equation: (brightness of white display)/(brightness of black display)= contrast ratio.

Figure 17:
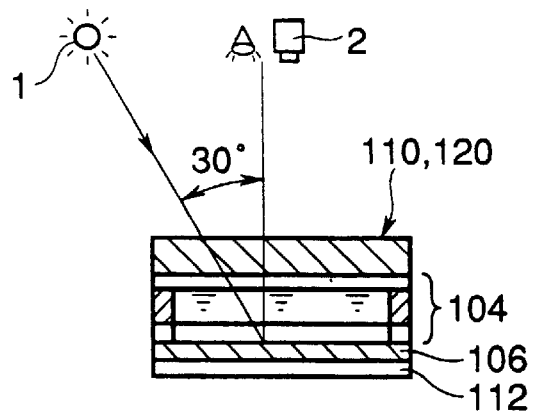
FIG. 17 gives a lateral view of a liquid crystal display apparatus of one example of this invention to illustrate how measurement is made on that apparatus.

The liquid crystal display used for the measurement was a reflection type liquid crystal display having a reflection plate acting as a mirror. Determination of the reflection of a given film consisted of, as shown in FIG. 17, placing a light source 1 such that light therefrom is incident on the surface of liquid crystal display apparatus 110 or 120 at an angle of 30° apart from the normal to the surface, measuring light reflected back along the normal with a brightness meter 2, comparing its intensity with that from a standard white reflection plate serving as a reference, and calculating the percent reflection. For colors, the sensory test dependent on vision was performed.

Figure 18:
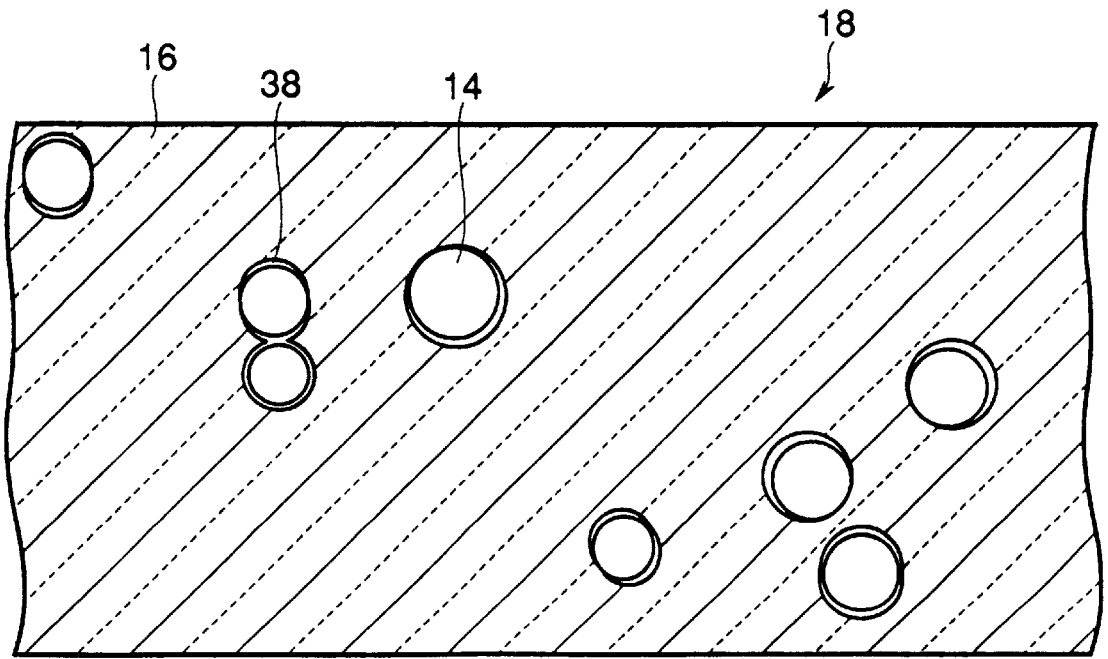
FIG. 18 gives an electronmicroscopic picture of the cross-section of a light diffusing plate of one example of this invention.

In another run, Examples 1 to 4 and comparative examples 1 to 3 were cut with a microtom to produce cross-sections, which were then observed with an electron microscope (Nippon Electronic Co.). It was found through this observation that, when melamine beads were used in combination with a light transmissive resin comprising a UV setting resin, the resulting film gave a profile as shown in FIG. 18 where at each interface between the two exists a low refractive layer with a thickness of several tenths $\mu$m or a space (probably filled with air). If the film contains acryl beads or does not contain a UV setting resin, it will not have such low refractive layer formed in its substance.

When a given film has such low refractive Layer in its substance, light passing through the light transmissive resin temporarily enters into this low refractive layer, but is reflected back by the surface of light transmissive diffusing material. Thus, such film will have a good light diffusing activity.

What is claimed is:

1. A polarizing plate with a light diffusing film including a transparent film substrate wherein a polarizing layer is laminated on one of the surfaces of transparent film substrate, and the light diffusing film which has, on the other side of the transparent film substrate, a light diffusing layer laminated comprising a light transmissive resin containing a light transmissive diffusing material being different from the light transmissive resin in refractive index, the haze value on the light diffusing layer is three or more, the difference between the haze value along the normal and that along the lines ±60° apart from the normal is four or less, and the surface roughness defined by is Ra 0.2 $\mu$m or less.

2. A polarizing plate with a light diffusing layer as described in claim 1 wherein, on either the polarizing layer or the light diffusing layer, an anti-reflection layer including an optical thin layer is laminated.

3. A polarizing plate with a light diffusing layer as described in claim 1 wherein a phase difference plate is further laminated.

4. A polarizing plate with a light diffusing film including a transparent film substrate wherein a polarizing layer is laminated on one of the surfaces of transparent film substrate, and the light diffusing film which has, on the other side of the transparent film substrate, a light diffusing layer laminated comprising a light transmissive resin containing a light transmissive diffusing material, on at least part of the interface between the light transmissive diffusing material and the light transmissive resin of the light diffusing layer, is inserted a layer having a lower refractive index than those of the light transmissive diffusing material and resin, wherein the haze value on the surface of light diffusing layer is three or more, and the difference between the haze value along the normal and that along the lines ±60° apart from the normal is four or less.

5. A polarizing plate with a light diffusing layer as described in claim 4 wherein, on either the polarizing layer or the light diffusing layer, an anti-reflection layer including an optical thin layer is laminated.

6. A polarizing plate with a light diffusing layer as described in claim 4 wherein a phase difference plate is further laminated.

* * * * *